Jan. 14, 1930.  E. PARVILLE  1,743,901
DOUBLE UNIVERSAL JOINT
Filed July 21, 1927
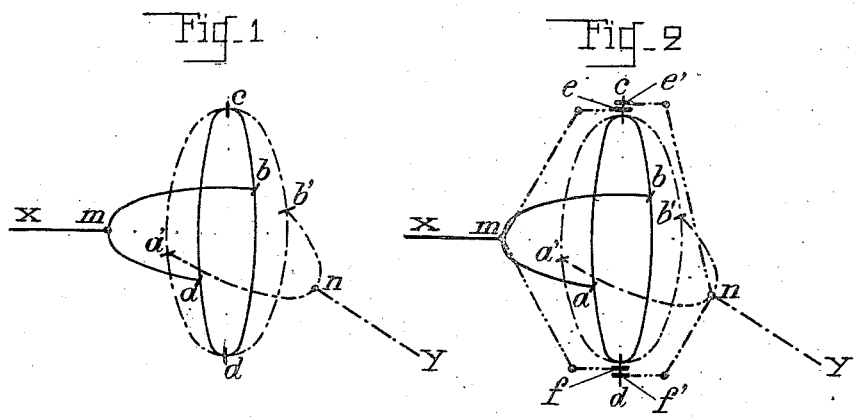
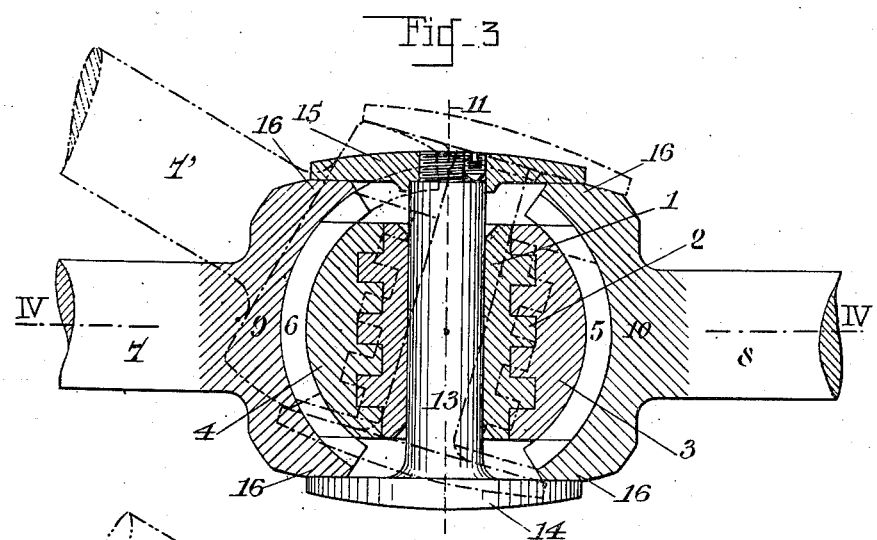
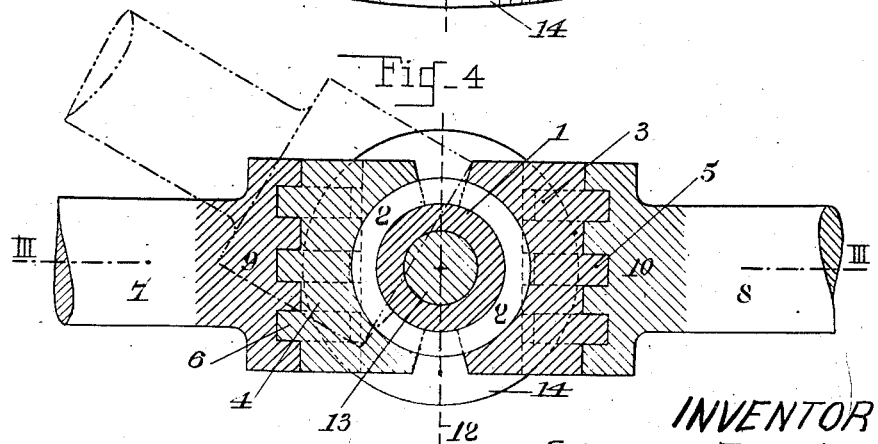
INVENTOR
Edmond Parville
by
Lanyun, Parry, Card and Lanyun
Att'ys.

Patented Jan. 14, 1930

1,743,901

UNITED STATES PATENT OFFICE

EDMOND PARVILLE, OF PARIS, FRANCE

DOUBLE UNIVERSAL JOINT

Application filed July 21, 1927, Serial No. 207,492, and in France July 21, 1926.

The transmission of the movement of rotation of a driving shaft to an actuated shaft which makes a certain angle with the former, is usually effected by means of universal joints of different types.

If the movement of rotation of the driving shaft is uniform, this is not the case for the actuated shaft, whose speed will pass during each revolution through two maxima and two minima. The rotation of the driving shaft will be the more irregular as the angle between the two shafts is greater, so that if the mechanism which is driven by the actuated shaft has a certain inertia, and if there is no elastic coupling between the mechanism and the said shaft, the stresses due to this inertia may occasion breakage of the parts.

To impart a uniform rotation to the actuated shaft, means may be employed consisting of two universal joints separated by an intermediate shaft.

It is evident that to obtain a uniform rotation of the driving shaft and the actuated shaft, the said shafts as well as the universal joints themselves must be always symmetrical with reference to the plane which is perpendicular to the said intermediate shaft and passes through the center of the said shaft, and in this event the motion of the actuated shaft will be an exact reproduction of the driving shaft, due to the symmetry of the device.

The construction can be simplified by the use of a double universal joint in which the aforesaid intermediate shaft used in the device with two universal joints is dispensed with, and herein the two universal joints have a common central pivoting axle.

The present invention relates to a double universal joint which comprises means for automatically maintaining the symmetry of the driving and the actuated shafts with reference to a plane which is perpendicular to the plane containing the two shafts and passing through the central axis of pivotation of the elements of the double joint.

The appended drawings show an embodiment of the present invention.

Fig. 1 is a theoretical diagram relating to the double joint.

Fig. 2 is a diagram relative to a joint according to the present invention.

Fig. 3 is a section on the line III—III of Fig. 4.

Fig. 4 is a section on the line IV—IV of Fig. 3.

Fig. 1 shows diagrammatically a driving shaft and an actuated shaft which are mounted so as to pivot about the two diameters $a\,b$ and $a'\,b'$ of two circles $a\,c\,b\,d$ and $a'\,c\,b'\,d$; these two circles may rotate about their common diameter $c\,d$ which forms the central axis of pivotation.

Let it be supposed that the shafts $x$ and $y$ with their axes of pivotation $a\,b$ and $a'\,b'$ are situated at a given moment in the same plane; if the shaft $y$ is displaced in this plane, the axis $a'\,b'$ will be drawn with it, and the circle $a'\,c\,b'\,d$ will be obliged to rotate about the common central axis of pivotation $c\,d$. This will not be the case if the shaft $y$ is moved out of the plane in which it was at first situated. The said shaft may now rotate freely about $a'\,b'$ without drawing with it the pivot axis $c\,d$.

Otherwise stated, for certain movements of the shaft $y$ relatively to the shaft $x$, the common central pivoting axis does not necessarily remain in the plane bisecting the angle between the said shafts i. e. the symmetry is not necessarily maintained.

In order that this symmetry shall be constantly maintained, it is necessary that when the shaft $y$ is inclined from the plane $a'\,c\,b'\,d$, the plane $a\,c\,b\,d$ shall be itself inclined from the shaft $x$ by the same angle, and this may be obtained by obliging the points $c$ and $d$ to remain respectively equidistant from the two points $m$ and $n$, for example.

A practical device may be constructed by disposing between the points $c$ and $m$, $n$ and $d$, $d$ and $m$, and $c$ and $n$, suitable traction springs of like nature which are mounted in the first place with a certain tension. It is observed that when the shaft $y$ tends to be inclined from the plane $a'\,c\,b'\,d$, the point $n$ being brought nearer to $c$, for instance, the spring $d\,n$ will draw upon the point $d$ until the tension of the two springs $d\,m$ and $d\,n$ is the same; at this time the symmetrical conditions will be maintained.

The same principle may obviously be applied by the use of a double universal which is derived from all the other known forms of universal joint.

In all cases, the double universal joint consists in the combination of two single universal joints having a common central axis of pivotation, the symmetry of said axis relatively to the driving shaft and the actuated shaft being obtained by means of tension or compression springs acting on the respective sides of said axis and in contact with two symmetrical points of the driving and the actuated shaft.

I may also oblige the said common central axis of pivotation of the two combined universal joints to remain in a plane of symmetry with reference to two shafts, by sliding at each end of said axis two collars which cooperate in their sliding motion but which may assume an angular displacement relative to one another, and by connecting each collar by a pair of links with two symmetrical points on the driving and the actuated shaft.

The diagrammatic Figure 2 shows the manner in which this method may be carried into effect.

The collars $e$ $f$ which are slidable on the common central axis of pivotation $c$ $d$ are each connected by links of the same length with the point $m$; the collars $e'$ $f'$ which are slidable at the same time as the collars $e$ $f$ are each connected by two links of equal length with the point $n$.

If the shaft $y$ is inclined from the plane $a'$ $b$ $c'$ $d$, and if the point $m$ is brought nearer to $c$, for instance, the collars $e$ $e'$ which slide at the same time will recede from the point $c$. The link $e$ $m$ will thus in its turn oblige the point $m$ to approach the point $c$. Since the point $e$ is connected with $m$ by the link $m$ $e$, the axis will become inclined from the plane $m$ $a$ $b$, by pivoting about the axis $a$ $b$, so that the symmetry will be established.

In a general manner, I may obtain the same result by the use of all other suitable mechanical devices such as rollers operating in slots, cams, or the like.

The following shows the construction of such a device by the use of cams, as applied to a double universal joint comprising a suitable core.

The double joint essentially comprises a central core 1 which is preferably cylindrical, upon which are formed one or more annular grooves with intervening ribs 2. Upon the said core are pivotally mounted the two shells 3 and 4 which carry internal ribs and grooves coacting with the said ribs and grooves in the core, and upon whose external cylindrical surface are formed a certain number of ribs and grooves 5—6 whose plane is perpendicular to the plane of the aforesaid ribs and grooves.

Each shaft 7—8 is terminated by an enlarged part 9 and 10 in which are formed annular ribs and grooves coacting with the external ribs and grooves of the two shells 3 and 4.

When the shafts 7 and 8 are in line, the annular ribs and grooves of the central core are perpendicular to the axis 11. The ribs and grooves of the enlarged parts of the two shafts are herein perpendicular to the axis 12; the axes 11 and 12 are at right angles to one another, and both these axes are situated in a plane perpendicular to the common axis of the two shafts.

In the said central core is slidable an axle 13 carrying two flat heads 14 and 15 having plane internal surfaces in contact with the cylindrical cams 16 formed on the enlarged portions of the driving and the actuated shafts. The outline of the said cams is such that when one of the shafts 8, for instance, remains stationary, if the other shaft 7 is inclined into the position 7', its enlarged part will slide along the ribs and grooves 6; the two cams 16 of said enlarged part will be in constant contact with the internal face of the said flat heads coacting therewith, and in these conditions the said heads, and with them the axle 13, will be inclined, thus moving the said central core which will assume the position shown in Fig. 3. The cams 16 of the enlarged parts of the shaft 8 will remain in contact with the internal faces of the said flat heads, and finally the axle 13, and with it the said core, will assume a symmetrical position with reference to the shafts 7' and 8; i. e. if the shafts 8 has a uniform rotation, in virtue of the symmetry, the same will be true for the shaft 7'. There will be no difficulty in forming the outline of the said cams this being the envelope of a straight line which rotates about a center and recedes therefrom by an amount proportional to its angular displacement.

In this case the principle is the same as the one specified in the first place. The two universal joints forming the double universal joint have a common central axis of pivotation which is represented by the central core and said axis is obliged to maintain a symmetrical position with reference to the two shafts irrespectively of the relative inclination of the said shafts, due to the action of the cams; and of the two flat heads.

For the construction of the said double universal joint comprising a core, I have herein employed a core and intermediate cylindrical shells, but I may also employ cores and shells of spherical form. By the arrangement adopted, I am enabled to construct a compact apparatus in which the torque is imparted by means of a plurality of ribs and grooves whereby the stresses are subdivided, whereas in the known devices consisting of simple universal joints provided with cores, the torque is transmitted by a single rib and groove.

Having now particularly described my invention and in what manner the same is to be performed, I claim as my invention:

1. A double universal joint comprising a central core provided with annular ribs and grooves, two intermediate shells pivoting on said core, provided with complementary interior ribs and grooves, and provided externally with circular ribs and grooves lying in planes perpendicular to the first-mentioned ribs and grooves, a driving and a driven shaft, ribs and grooves on the ends of said shafts corresponding to the exterior ribs and grooves of said intermediate shells, and inter-engaging therewith, and means for maintaining the axis of the central core in the plane bisecting the angle between said shafts.

2. A universal joint as claimed in claim 1 including a central core, driving and driven shafts having bearing surfaces at their adjacent extremities, a pin traversing the central core having a head at each end, said head bearing against the bearing surfaces of said driving and driven shafts.

3. A universal joint comprising a central cylindrical core provided with ribs and grooves, two intermediate shells pivotally mounted on said core with internal and external ribs and grooves arranged at right angles to each other, a driving and a driven shaft pivotally mounted on the respective shells provided with bearing portions having ribs and grooves engaging with the external ribs and grooves of said shells for pivotally mounting said shafts on said shells, a shaft slidable in said core, cam surfaces upon said driving and driven shafts, flat heads on the ends of said shaft engageable with said cam surfaces upon said driving and driven shafts for maintaining the symmetry of the central core relative to the axes of the two shafts in all angular positions of the latter.

Signed at Paris this 11th day of July, 1927.

EDMOND PARVILLE.